United States Patent Office.

JOHN W. HYATT, JR., OF ALBANY, AND DAVID BLAKE, OF SPENCERTOWN, NEW YORK.

Letters Patent No. 89,582, dated May 4, 1869.

IMPROVED COMPOUND OF IVORY-DUST AND OTHER MATERIALS.

The Schedule referred to in these Letters Patent and making part of the same.

Be it known that we, JOHN W. HYATT, Jr., of Albany, State of New York, and DAVID BLAKE, of Spencertown, in the same State, have invented a new and useful Method of Combining Ivory-Dust and other Substances with Collodion into a Solid Form; and we hereby declare the following to be a full, clear, and exact description of the method thereof.

We form the collodion by taking, say, one pound of gun-cotton and dissolving it in a mixture of equal parts of alcohol and ether, in sufficient quantity to produce a thick solution. With this solution we mix three pounds of ivory-dust, pulverized very fine and purified, forming the whole into a plastic mass.

We then put the mass so formed into moulds, and subject it to a constant pressure, until the alcohol and ether it contains are evaporated.

We accelerate the process of evaporation by the simultaneous application of heat to the moulds.

The object of the pressure is to force the particles of ivory-dust into closer union, while the evaporation is going on, so that in the end a compact and homogeneous quality of ivory is produced.

We achieve the best results by gradually increasing the pressure to about ten thousand pounds to the square inch.

Natural ivory possesses many imperfections and inequalities, rendering it liable to shrink, warp, and check, while ivory manufactured by the above-described process is free from these objections, is fine and uniform in quality, strong in texture, without blemishes, and susceptible of a high polish.

The collodion, in manufacturing ivory by this process, is so limited in quantity, and when evaporated, so perfectly resembles ivory that it does not practically modify its purity.

The ivory so manufactured may be colored by mixing coloring-matter with the material while in a plastic state, and before pressure in the moulds, or in the usual manner, by outward application.

Other materials may be combined and united by this process, such as bone-dust, paper-flock, asbestos, and other substances, reduced to powder.

The described proportions of one pound of gun-cotton to three pounds of ivory-dust may be somewhat varied, without affecting the nature of our invention.

Having described our invention,

What we claim as new, and desire to secure by Letters Patent, is—

1. Agglutinizing ivory-dust, or other pulverized material, by combining collodion therewith, and subjecting the composition to pressure during the evaporation of the volatile elements, substantially as described.

2. The evaporation of the alcohol and ether by means of heat, substantially as described.

JOHN W. HYATT, Jr.
DAVID BLAKE.

Witnesses:
ISAIAH S. HYATT,
JOHN VAN DYCK.